United States Patent
Nakayashiki et al.

(10) Patent No.: US 7,189,187 B2
(45) Date of Patent: Mar. 13, 2007

(54) CONTROL APPARATUS AND METHOD FOR VEHICULAR AUTOMATIC TRANSMISSION

(75) Inventors: Makoto Nakayashiki, Nishikamo-gun (JP); Tooru Matsubara, Toyota (JP); Takahiro Sakai, Toyota (JP); Yoshio Hasegawa, Chiryu (JP); Yoshikazu Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 200 days.

(21) Appl. No.: 10/849,058

(22) Filed: May 20, 2004

(65) Prior Publication Data

US 2004/0242360 A1    Dec. 2, 2004

(30) Foreign Application Priority Data

May 30, 2003 (JP) .............................. 2003-155654

(51) Int. Cl.
*F16H 61/26* (2006.01)

(52) U.S. Cl. ...................................... 477/159

(58) Field of Classification Search ................. 477/70, 477/76, 98, 174, 175, 902, 158, 159, 160, 477/163, 115; 701/60, 66; 475/117, 120, 475/125, 127; 74/337, 335, 336 R
See application file for complete search history.

(56) References Cited

U.S. PATENT DOCUMENTS

| | | | | |
|---|---|---|---|---|
| 4,651,142 A | * | 3/1987 | Klatt | 340/453 |
| 4,730,708 A | * | 3/1988 | Hamano et al. | 477/114 |
| 4,775,938 A | * | 10/1988 | Hiramatsu | 701/60 |
| 5,272,630 A | * | 12/1993 | Brown et al. | 701/68 |
| 6,039,673 A | * | 3/2000 | Mikami et al. | 477/93 |
| 6,148,975 A | * | 11/2000 | Shih | 192/3.62 |
| 6,440,039 B1 | * | 8/2002 | Warren | 477/86 |
| 6,843,754 B2 | * | 1/2005 | Mori et al. | 477/92 |

FOREIGN PATENT DOCUMENTS

| | | |
|---|---|---|
| JP | 8-338501 | 12/1996 |
| JP | 9-32917 | 2/1997 |
| JP | 11-230329 A | 8/1999 |
| JP | 2002-29289 A | 1/2002 |
| JP | 2002 39348 A | 2/2002 |

* cited by examiner

*Primary Examiner*—Roger Pang
*Assistant Examiner*—Justin K. Holmes
(74) *Attorney, Agent, or Firm*—Oblon, Spivak, McClelland, Maier & Neustadt, P.C.

(57) ABSTRACT

A control apparatus for a vehicular automatic transmission includes a control portion that executes a neutral control in which the control portion places the automatic transmission in a neutral state by reducing an application load on a frictional apply device inside the automatic transmission when the vehicle is stopped. The control portion ends the neutral control when a torque transmitted to the frictional apply device has been continually equal to, or greater than, a predetermined value for a consecutive predetermined of time. As a result, by considering the torque transmitted to the frictional apply device in addition to the continuation time of the neutral control, it is possible to more precisely grasp the state of the frictional apply device. In other words, it is possible to execute, as quickly as possible, neutral control for an extended period of time while ensuring durability of the frictional apply device.

15 Claims, 9 Drawing Sheets

|     | C1 | C2 | C3 | C4 | B1 | B2 | B3 | B4 | F0 | F1 | F2 | F3 |
|-----|----|----|----|----|----|----|----|----|----|----|----|----|
| Rev |    |    | ○  |    | △  |    |    | ○  |    | ○  |    |    |
| N   |    |    |    |    |    |    |    |    |    |    |    |    |
| 1st | ○  |    |    | △  |    |    |    | △  | ○  |    |    | ○  |
| 2nd | ○  |    |    | △  |    | △  | ○  |    | ○  | ○  | ○  |    |
| 3rd | ○  |    | ○  | △  | △  |    | ●  |    | ○  | ○  |    |    |
| 4th | ○  | ○  | ●  | △  |    |    | ●  |    | ○  |    |    |    |
| 5th | ●  | ○  | ○  |    | ○  |    | ●  |    |    |    |    |    |
| 6th | ●  | ○  |    |    | ●  | ○  | ●  |    |    |    |    |    |

(tc1enetmp_map)

|   | e1 | e2 | e3 | e4 | ··· | en |
|---|---|---|---|---|---|---|
| $N_{E1}$ | ... | ... | ... | ... |  | ... |
| $N_{E2}$ | ... | ... | ... | ... |  | ... |
| ⋮ | ... | ... | ... | ... |  | ... |
| $N_{Em}$ | ... | ... | ... | ... |  | ... |

FIG.9

(tc1tho_map)

| $T_{OIL1}$ | $T_{OIL2}$ | $T_{OIL3}$ | $T_{OIL4}$ | ··· | $T_{OILn}$ |
|---|---|---|---|---|---|
| ... | ... | ... | ... |  | ... |

FIG.10

(tc1ntrexetho_map)

| $t_1$ | $t_2$ | $t_3$ | $t_4$ | · · · | $t_n$ |
|---|---|---|---|---|---|
| ... | ... | ... | ... |  | ... |

FIG.11

(c1tmpdw_map)

| $\Delta T_1$ | $\Delta T_2$ | $\Delta T_3$ | $\Delta T_4$ | · · · | $\Delta T_n$ |
|---|---|---|---|---|---|
| ... | ... | ... | ... |  | ... |

US 7,189,187 B2

CONTROL APPARATUS AND METHOD FOR VEHICULAR AUTOMATIC TRANSMISSION

INCORPORATION BY REFERENCE

The disclosure of Japanese Patent Application No. 2003-155654 filed on May 30, 2003, including the specification, drawings and abstract is incorporated herein by reference in its entirety.

BACKGROUND OF THE INVENTION

1. Field of the Invention

The invention relates to a control apparatus and method for a vehicular automatic transmission. More particularly, the invention relates to technology for executing a neutral control for as long as possible while ensuring durability of a frictional apply device in the automatic transmission.

2. Description of the Related Art

A known control apparatus for a vehicular automatic transmission, such as that disclosed in JP(A) 9-32917, includes a frictional apply device and a control portion. The frictional apply device serves as an input clutch, increasing or decreasing torque transmitted from the engine depending on whether it is applied, slipping, or released. The control portion places the automatic transmission in a substantially neutral state by reducing an application load on the frictional apply device when the vehicle is stopped. This operation, known as neutral control, reduces the engine load which improves fuel efficiency.

When a certain amount of torque is allowed to be transmitted to the frictional apply device during the neutral control, however, the temperature of the frictional apply device increases excessively, which may reduce the durability of the frictional apply device. The reason for this excessive rise in temperature is that the neutral control has been continuously executed for equal to, or greater than, a predetermined period of time or that a transmitted torque that is greater than an expected value has been applied to the frictional apply device. In order to prevent the temperature of the frictional apply device from rising, the foregoing technology sets the time for which neutral control can be continuously executed using only the continuation time of the neutral control as the determination criteria. In consideration of durability in the most severe circumstances, this technology makes the time for which neutral control can be continuously executed relatively short.

SUMMARY OF THE INVENTION

In view of the foregoing problems, the invention thus provides a control apparatus and method for a vehicular automatic transmission. This control apparatus is provided with a control portion which executes a neutral control in which the control portion places the automatic transmission in a neutral state by reducing an application load on the frictional apply device in the automatic transmission while the vehicle is stopped. This control portion ends the neutral control when the torque transmitted to the frictional apply device has been equal to, or greater than, a predetermined value for a consecutive predetermined time. Also, the control method includes i) executing a neutral control that includes placing the automatic transmission in a neutral state by reducing an application load on the frictional apply device in the automatic transmission while the vehicle is stopped, and ii) ending the neutral control when the torque transmitted to the frictional apply device has been equal to, or greater than, a predetermined value for a consecutive predetermined time.

According to the foregoing control apparatus and method, the control portion ends the control when the torque transmitted to the frictional apply device has been equal to, or greater than, a predetermined value for a consecutive predetermined time. Accordingly, by considering the torque transmitted to the frictional apply device in addition to the continuation time of the neutral control, it is possible to more precisely grasp the state of the frictional apply device. In other words, it is possible to provide a control apparatus and method for a vehicular automatic transmission, which is able to execute, as quickly as possible, neutral control for an extended period of time while ensuring durability of the frictional apply device.

BRIEF DESCRIPTION OF THE DRAWINGS

The above-mentioned embodiment and other embodiments, objects, features, advantages, technical and industrial significance of this invention will be better understood by reading the following detailed description of the preferred embodiments of the invention, when considered in connection with the accompanying drawings, in which.

DETAILED DESCRIPTION OF THE PREFERRED EMBODIMENTS

In the following description and the accompanying drawings, the present invention will be described in more detail in terms of exemplary embodiments.

Figure 1:
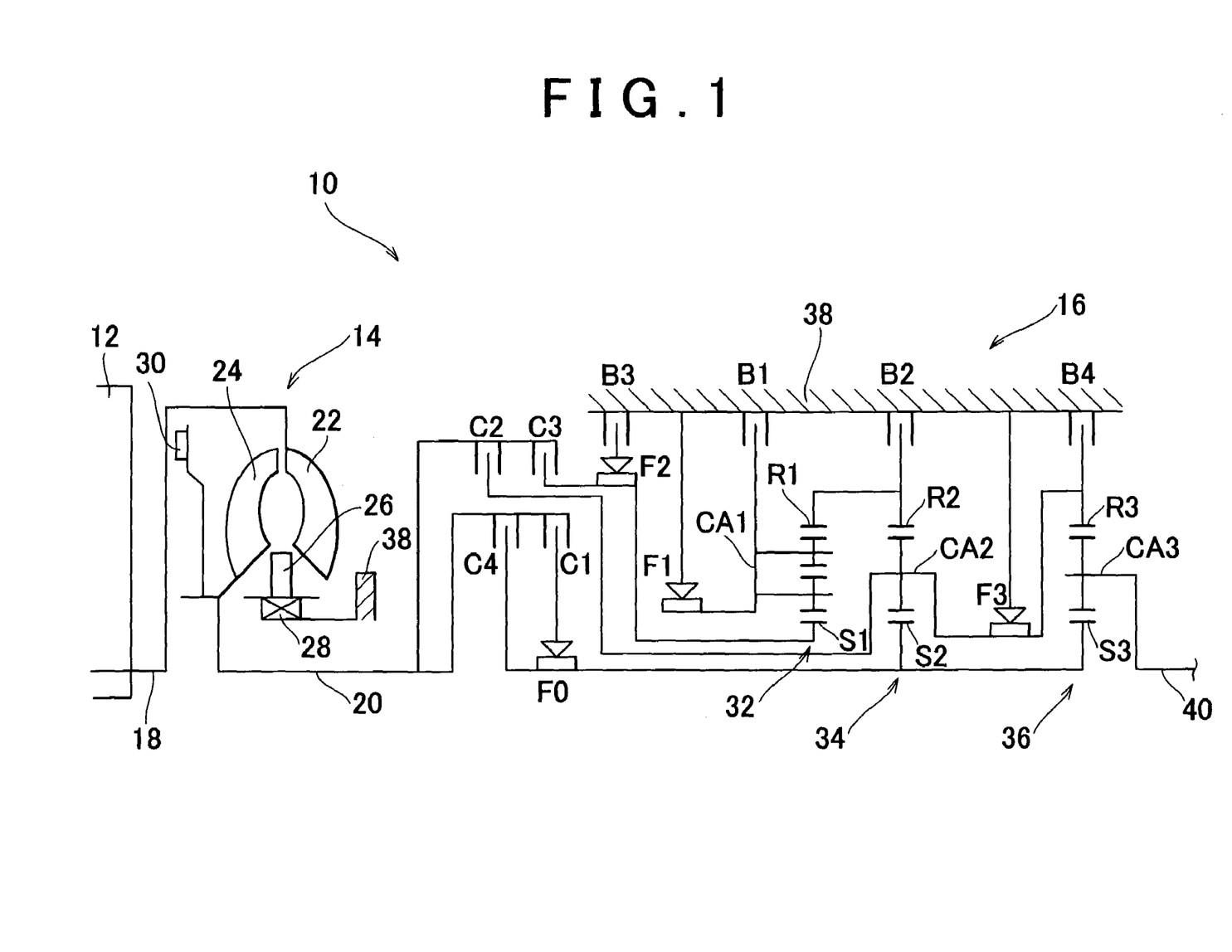
FIG. 1 is a skeleton view showing the construction of a driving force transmitting apparatus to which a control apparatus for a vehicular automatic transmission according to one exemplary embodiment of the invention can be applied.

FIG. 1 is a skeleton view showing the construction of a driving force transmitting apparatus 10 to which a control apparatus for an automatic transmission of a vehicle according to one exemplary embodiment of the invention can be applied. In the drawing, output from an engine 12, which is a source of driving force for running the. vehicle, is input to an automatic transmission 16 via a torque converter 14, which is a fluid power transmitting apparatus, and then transmitted via a differential gear unit and wheel axles to driven wheels, not shown.

The engine 12 is an internal combustion engine such as a gasoline engine which generates driving power by the combustion of fuel injected into a cylinder. The torque converter 14 includes a pump impeller 22, a turbine impeller 24, and a stator impeller 26. The pump impeller 22 is coupled to a crank shaft 18 of the engine 12. The turbine impeller 24 is coupled to an input shaft 20 of the automatic transmission 16. The stator impeller 26 is prevented by a one-way clutch 28 from rotating in one direction with respect to a housing 38 of the automatic transmission 16. The torque converter 14 uses fluid to transmit power from the pump impeller 22 to the turbine impeller 24. A lockup clutch 30 is provided between the pump impeller 22 and the turbine impeller 24 for connecting them directly to each other.

The automatic transmission 16 is a planetary gear type transmission, and includes a double pinion type first planetary gear set 32, a single pinion type second planetary gear set 34, and a single pinion type third planetary gear set 36. A sun gear S1 of the first planetary gear set 32 can be selectively coupled to the input shaft 20 via a third clutch C3, and also selectively coupled to the housing 38 via a one-way clutch F2 and a third brake B3 to prevent it from rotating in a direction opposite to that of the input shaft 20. A carrier CA1 of the first planetary gear set 32 can be selectively coupled to the housing 38 via a first brake B1, and is constantly prevented from rotating in the opposite direction by a one-way clutch F1 which is arranged in parallel with the first brake B1. A ring gear R1 of the first planetary gear set 32 is integrally coupled to a ring gear R2 of the second planetary gear set 34 and can be selectively coupled to the housing 38 via a second brake B2. A sun gear S2 of the second planetary gear set 34 is integrally coupled to a sun gear S3 of the third planetary gear set 36 and can be selectively coupled to the input shaft 20 via a fourth clutch C4, and also selectively coupled to the input shaft 20 via a one-way clutch F0 and a first clutch C1 so as to be prevented from rotating in the direction opposite that of the input shaft 20. A carrier CA2 of the second planetary gear set 34 is integrally coupled to a ring gear R3 of the third planetary gear set 36, and can also be selectively coupled to the housing 38 via a fourth brake B4. The carrier CA2 is further constantly prevented from rotating in the opposite direction by a one-way clutch F3 which is arranged in parallel with the fourth brake B4. A carrier CA3 of the third planetary gear set 36 is integrally coupled to an output shaft 40.

Figure 2:
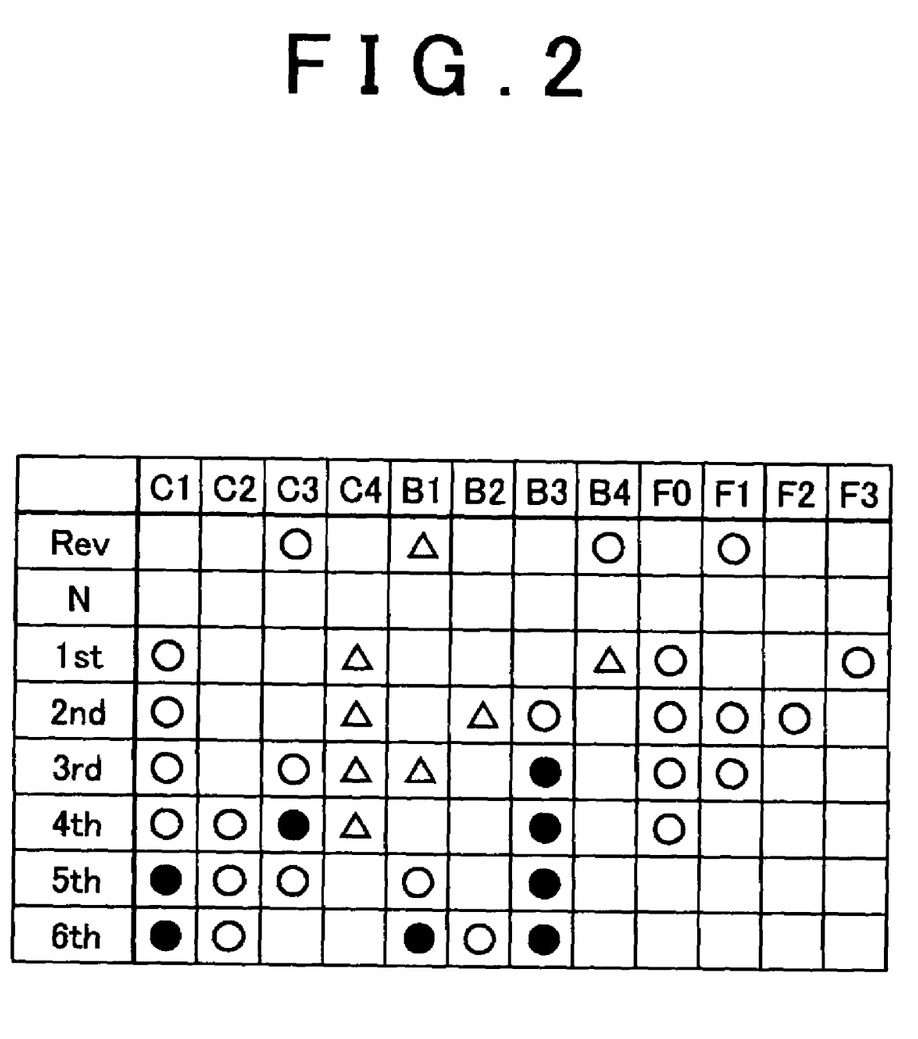
FIG. 2 is a clutch and brake application chart showing various application and release combinations of clutches and brakes to achieve specific speeds in the automatic transmission shown in FIG. 1.

FIG. 2 is a clutch and brake application chart showing various application and release combinations of clutches and brakes to achieve specific speeds in the automatic transmission 16. In this chart, a single circle indicates an applied state, the absence of a symbol indicates a released state, a triangle indicates an applied state only during engine brake, and a black circle indicates an applied state but with no load being carried. The first clutch C1, second clutch C2, third clutch C3, fourth clutch C4, first brake B1, second brake B2, third brake B3, and fourth brake B4 provided in the automatic transmission 16 are all hydraulic frictional apply devices, such as multiple disc clutches or brakes, that are controlled by hydraulic actuators. These hydraulic frictional apply devices are switched between applied and released states, as shown in FIG. 2, by energizing or de-energizing solenoid valves Sol1, Sol2, Sol3, Sol4, and Sol5, linear solenoid valves SL1 and SL2, and the like provided in a hydraulic pressure control circuit 82 shown in FIG. 3. Six forward speeds "1st" to "6th" and one reverse speed "Rev" are established by switching these hydraulic frictional apply devices according to the operating position of a shift lever 78 shown in FIG. 3 and the running state of the vehicle and the like. As the automatic transmission is shifted from first speed "1st" to sixth speed "6th", the gear ratio (=rotational speed $N_{IN}$ of the input shaft 20/rotational speed $N_{OUT}$ of the output shaft 40) decreases. In this exemplary embodiment, the gear ratio of fourth speed "4th" is 1.0.

Figure 3:
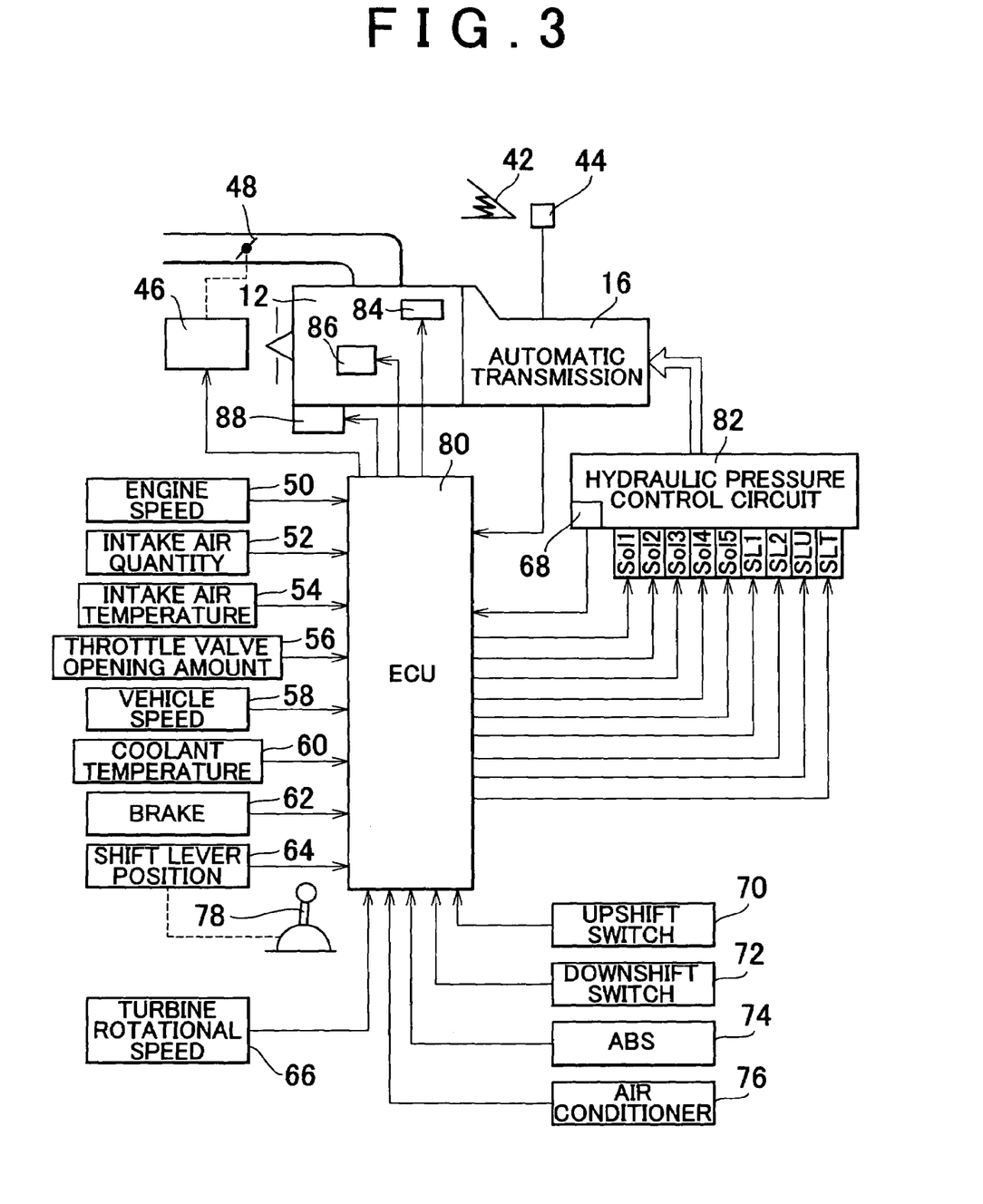
FIG. 3 is a block line diagram of a control system provided in the vehicle for controlling the engine and automatic transmission and the like shown in FIG. 1.

FIG. 3 is a block line diagram of a control system provided in the vehicle for controlling the engine 12 and automatic transmission 16 and the like.

As shown in the drawing, an accelerator opening amount sensor 44 detects an accelerator opening amount $A_{CC}$. This accelerator opening amount $A_{CC}$ is indicative of an operation amount (i.e., depression amount) of an accelerator pedal 42 operated by a driver. An electronic throttle valve 48 is disposed in an intake pipe of the engine 12. This electronic throttle valve 48 is controlled by a throttle actuator 46 to control an idle speed $N_{EIDL}$ of the engine 12. Also, the electronic throttle valve 48 is set to an opening angle, i.e., a throttle opening amount $\theta_{TH}$, in accordance with the accelerator opening amount $A_{CC}$.

In the control system according to this exemplary embodiment of the invention, various sensors and switches are provided. Some of these sensors and switches include an engine speed sensor 50 for detecting a rotational speed $N_E$ of the engine 12; an intake air quantity sensor 52 for detecting an intake air quantity Q of the engine 12; an intake air temperature sensor 54 for detecting an intake air temperature $T_A$; a throttle sensor 56 with an idle switch for detecting when the electronic throttle valve 48 is fully closed (i.e., for detecting when the engine 12 is idling), as well as for detecting the throttle opening amount $\theta_{TH}$ of the electronic throttle valve 48; a vehicle speed sensor 58 for detecting a vehicle speed V corresponding to a rotational speed $N_{OUT}$ of the output shaft 40; a coolant temperature sensor 60 for detecting a coolant temperature $T_W$ of the engine 12; a brake switch 62 for detecting whether a foot brake, not shown, which is the regular brake, is being operated; a shift lever position sensor 64 for detecting the lever position (i.e., operating position) $P_{SH}$ of a shift lever 78; a turbine rotational speed sensor 66 for detecting a turbine rotational speed $N_T$ corresponding to the rotational speed $N_{IN}$ of the input shaft 20; an automatic transmission fluid temperature sensor 68 for detecting an automatic transmission fluid temperature $T_{OIL}$ which is the temperature of hydraulic fluid in the hydraulic pressure control circuit 82; an upshift switch 70; and a downshift switch 72.

These various sensors and switches each send signals to the electronic control unit (ECU) 80. These signals include signals indicative of the engine speed $N_E$, the intake air quantity Q, the intake air temperature $T_A$, the throttle opening amount $\theta_{TH}$, the vehicle speed V, the coolant temperature $T_W$, whether or not the brake is being operated, the shift lever position $P_{SH}$, the turbine rotational speed $N_T$, the automatic transmission fluid temperature $T_{OIL}$, and an upshift command $R_{UP}$, and a downshift command $R_{DN}$ of the shift range.

The ECU 80 is connected to an ABS (antilock braking system) 74 which controls the braking force so that the wheels do not lock up (i.e., so that the wheels slip) when the foot brake is operated. Information such as that relating to the brake hydraulic pressure corresponding to the brake force, as well as a signal from an air conditioner 76 indicative of whether or not the air conditioner 76 is being operated, are supplied to the ECU 80.

The ECU 80 includes a so-called microcomputer that includes a CPU, RAM, ROM, an input/output interface and the like. The microcomputer processes the various signals according to programs pre-stored in the ROM while using the temporary memory function of the RAM. By this operation, the ECU 80 executes basic controls such as output control of the engine 12 and shift control of the automatic transmission 16, as well as neutral control and the like while the vehicle is stopped.

For example, during output control of the engine 12, the ECU 80 opens or closes the electronic throttle valve 48 with the throttle actuator 46, controls the fuel injection valve 84 in order to control the fuel injection quantity, and controls an ignition apparatus 86 such as an igniter for ignition timing control. During control of the electronic throttle valve 48, the ECU 80 drives the electronic throttle valve 48 based on the actual accelerator opening amount $A_{CC}$ from a predetermined relationship, increasing the throttle opening amount $\theta_{TH}$ the greater the accelerator opening amount $A_{CC}$.

During startup of the engine 12, the ECU 80 cranks the crank shaft 18 of the engine 12 with a starter (i.e., electric motor) 88. For shifting, the hydraulic pressure control circuit 82 includes linear solenoid valves SLU and SLT in addition to the solenoid valves Sol1 to Sol5 and the linear solenoid valves SL1 and SL2. The linear solenoid valve SLU mainly controls the lockup pressure relating to the application and release of the lockup clutch 30. The linear solenoid valve SLT mainly controls the line pressure. The hydraulic fluid in the hydraulic pressure control circuit 82 is also supplied to the stator impeller 26, and is also used to lubricate the various parts of the automatic transmission 16 and the like.

Figure 4:
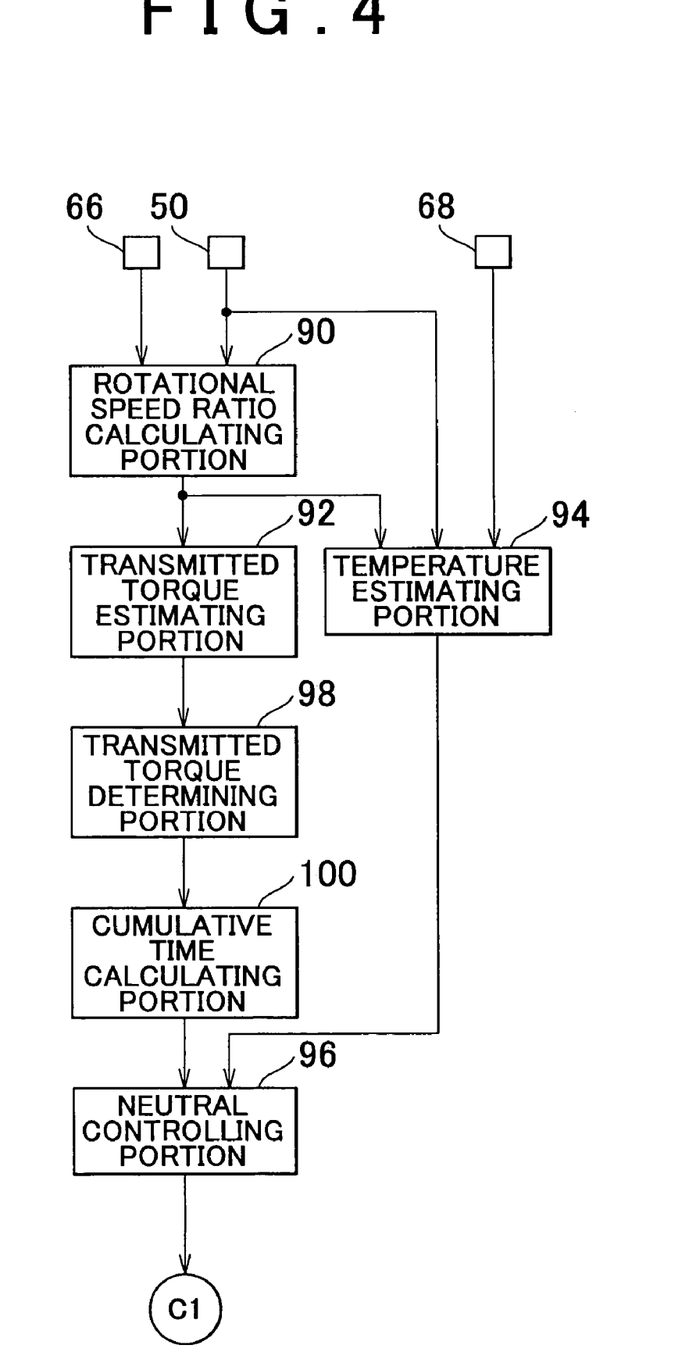
FIG. 4 is a functional block line diagram illustrating a major part of a control function of an electronic control unit shown in FIG. 3.

FIG. 4 is a functional block line diagram illustrating a major part of a control function of the ECU 80. A rotational speed ratio calculating portion 90 shown in FIG. 4 calculates an input/output rotational speed ratio e (=turbine rotational speed $N_T$/engine speed $N_E$) of the torque converter 14 from the engine speed $N_E$ and the turbine rotational speed $N_T$. The engine speed $N_E$ is detected by the engine speed sensor 50, and the turbine rotational speed $N_T$ is detected by the turbine rotational speed sensor 66.

A transmitted torque estimating portion 92 estimates the torque transmitted to the frictional apply device, which functions as the input clutch, based on a predetermined relationship between the engine speed $N_E$ and the turbine rotational speed $N_T$. This input clutch is a frictional apply device that is applied, so as to transmit driving force, when the vehicle is moving forward. The first clutch C1 in the driving force transmitting apparatus 10 corresponds to this input clutch. The transmitted torque estimating portion 92 calculates an estimated input torque inptrq of the first clutch C1 according to Expression 1 below, based on the accelerator opening amount $A_{CC}$, an engine torque engtrq, and a torque ratio τ, for example. Here, the accelerator opening amount $A_{CC}$ is detected by the accelerator opening amount sensor 44. The engine torque engtrq is calculated based on the engine speed $N_E$. The torque ratio τ is calculated based on the rotational speed ratio e of the torque converter 14 that is calculated by the rotational speed ratio calculating portion 90 from a predetermined relationship. Further, the transmitted torque estimating portion 92 calculates an estimated transmitted torque tc1trq of the first clutch C1 according to Expression 2 below, based on an input torque $T_{IN}$ of the torque converter 14 and a distribution ratio σ of the first clutch C1.

$$inptrq = \tau \times engtrq \qquad (1)$$

$$tc1trq = \sigma \times inptrq \qquad (2)$$

Figure 8:
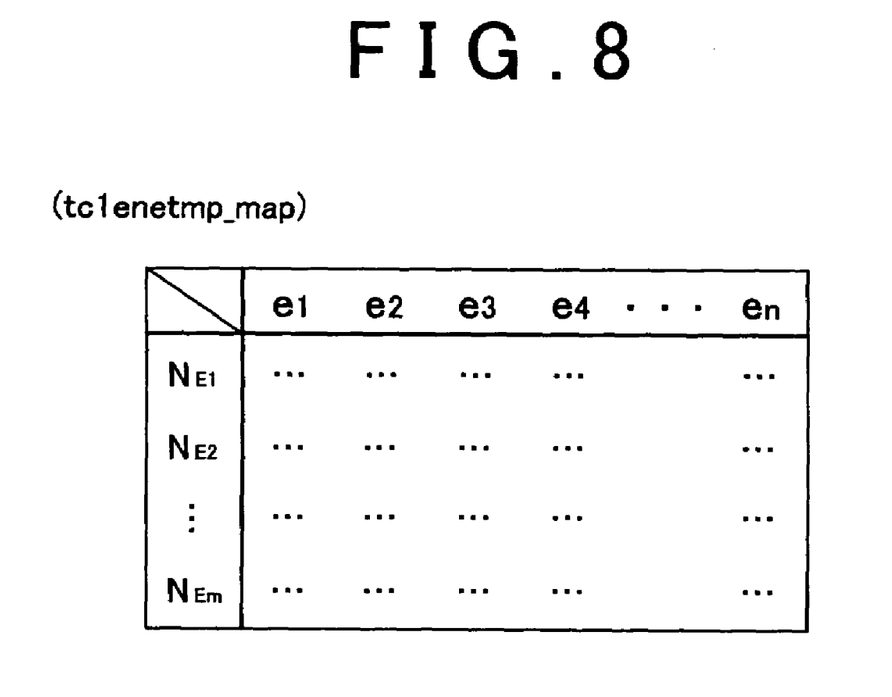
FIG. 8 is a map that determines a first coefficient for calculating the estimated temperature of the first clutch.
Figure 9:
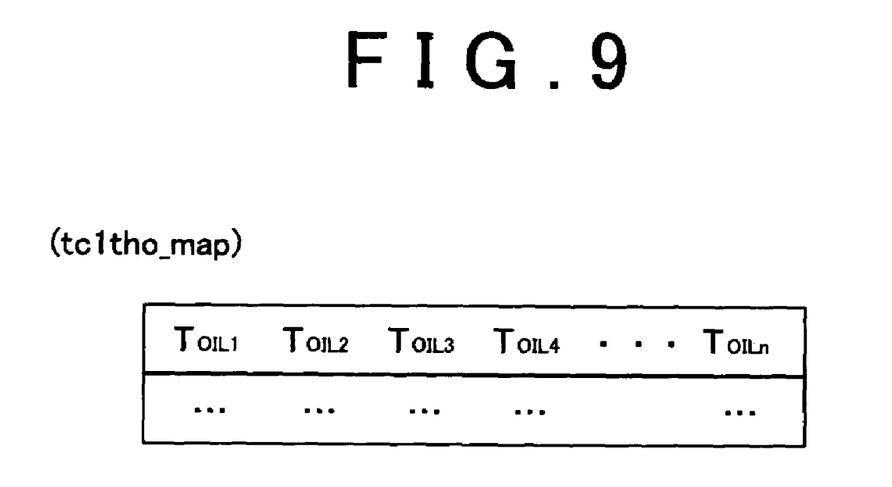
FIG. 9 is a map that determines a second coefficient for calculating the estimated temperature of the first clutch.
Figure 10:
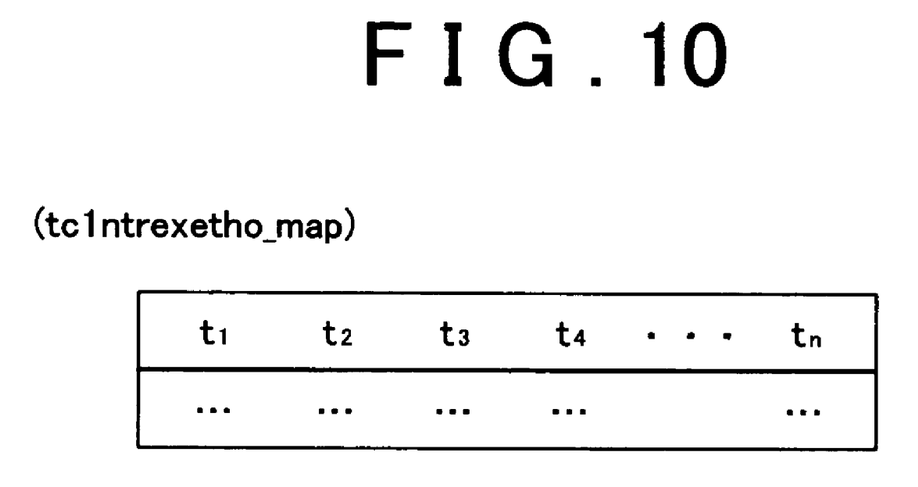
FIG. 10 is a map that determines a third coefficient for calculating the estimated temperature of the first clutch.
Figure 11:
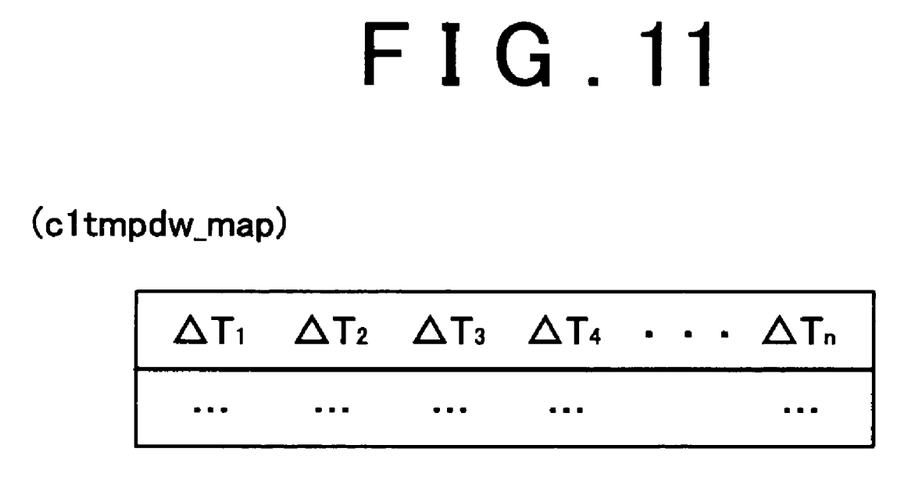
FIG. 11 is a map that determines an estimated temperature drop for calculating the estimated temperature of the first clutch.

The temperature estimating portion 94 estimates the temperature of the first clutch C1 from a predetermined relationship between the engine speed $N_E$, the turbine rotational speed $N_T$, and the automatic transmission fluid temperature $T_{OIL}$. Here, the engine speed $N_E$ is detected by the engine speed sensor 50, the turbine rotational speed $N_T$ is detected by the turbine rotational speed sensor 66, and the automatic transmission fluid temperature $T_{OIL}$ is detected by the automatic transmission fluid temperature sensor 68. The temperature estimating portion 94 calculates an estimated temperature rise c1tmup of the first clutch C1 according to Expression 3 below, based on a first coefficient K1, a second coefficient K2, and a third coefficient K3 during neutral control while the vehicle is stopped, for example. The first coefficient K1 is obtained based on the rotational speed ratio e and the engine speed $N_E$ from the map shown in FIG. 8. The second coefficient K2 is obtained based on the automatic transmission fluid temperature $T_{OIL}$ from the map shown in FIG. 9. The third coefficient K3 is obtained based on a continuation time t of the neutral control from the map shown in FIG. 10. The temperature estimating portion 94 also calculates an estimated temperature tc1tmp of the first clutch C1 according to Expression 4. During normal running when neutral control is not being executed, the temperature estimating portion 94 calculates an estimated temperature drop c1tmdw of the first clutch C1 based on a temperature difference ΔT between the estimated temperature tc1tmp of the first clutch C1 and the automatic transmission fluid temperature $T_{OIL}$ at that time from the map shown in FIG. 11, as well as calculates the estimated temperature tc1tmp of the first clutch C1 according to Expression 5 below.

$$c1tmup = K1 \times K2 \times K3 \quad (3)$$

$$tc1tmp_i = tc1tmp_{i-1} + c1tmup \quad (4)$$

$$tc1tmp_j = tc1tmp_{j-1} - c1tmdw \quad (5)$$

A control portion 96 executes the neutral control, in which the control portion 96 places the automatic transmission 16 in the neutral state by controlling the first clutch C1, which is the input clutch when the vehicle is stopped. More specifically, creep torque is reduced by reducing the application load on the first clutch C1 via the solenoid valves Sol1 to Sol5 and linear solenoid valves SL1 and SL2 and the like for shifting, which are provided in the hydraulic pressure control circuit 82. The neutral state is a state that is substantially equivalent to a state in which transmission of driving force is completely interrupted, or a state in which transmission of driving force is interrupted while a slight amount of torque is allowed to be transmitted by the input clutch. The control portion 96 preferably controls the first clutch C1 so that the input/output torque ratio τ of the torque converter 14 becomes about 0.96.

Also, the control portion 96 preferably ends the neutral control when the torque transmitted to the first clutch C1 continues to be equal to, or greater than, a predetermined value for a predetermined period of time.

Therefore, the electronic control unit has a transmitted torque determining portion 98 and a cumulative time calculating portion 100. The transmitted torque determining portion 98 determines whether an estimated transmitted torque tc1trq of the first clutch C1 that is calculated by the transmitted torque estimating portion 92 is equal to, or greater than, a predetermined value TRQTH. The cumulative time calculating portion 100 calculates a cumulative time tentr for which the estimated transmitted torque tc1trq of the first clutch C1 has continually been equal to, or greater than, the predetermined value TRQTH by cumulating the time when the transmitted torque determining portion 98 has made a positive determination. The control portion 96 ends the neutral control when the cumulative time tentr calculated by the cumulative time calculating portion 100 reaches a predetermined time TENTRED.

The control portion 96 preferably starts the neutral control when the estimated temperature tc1tmp of the first clutch C1 calculated by the temperature estimating portion 94 is less than a predetermined value TNTRST. In other words, the control portion prohibits execution of the neutral control when the estimated temperature tc1tmp of the first clutch C1 is equal to, or greater than, the predetermined value TNTRST. The control portion ends the neutral control when the estimated temperature tc1tmp becomes equal to, or greater than, a predetermined value TNTRST.

Figure 5:
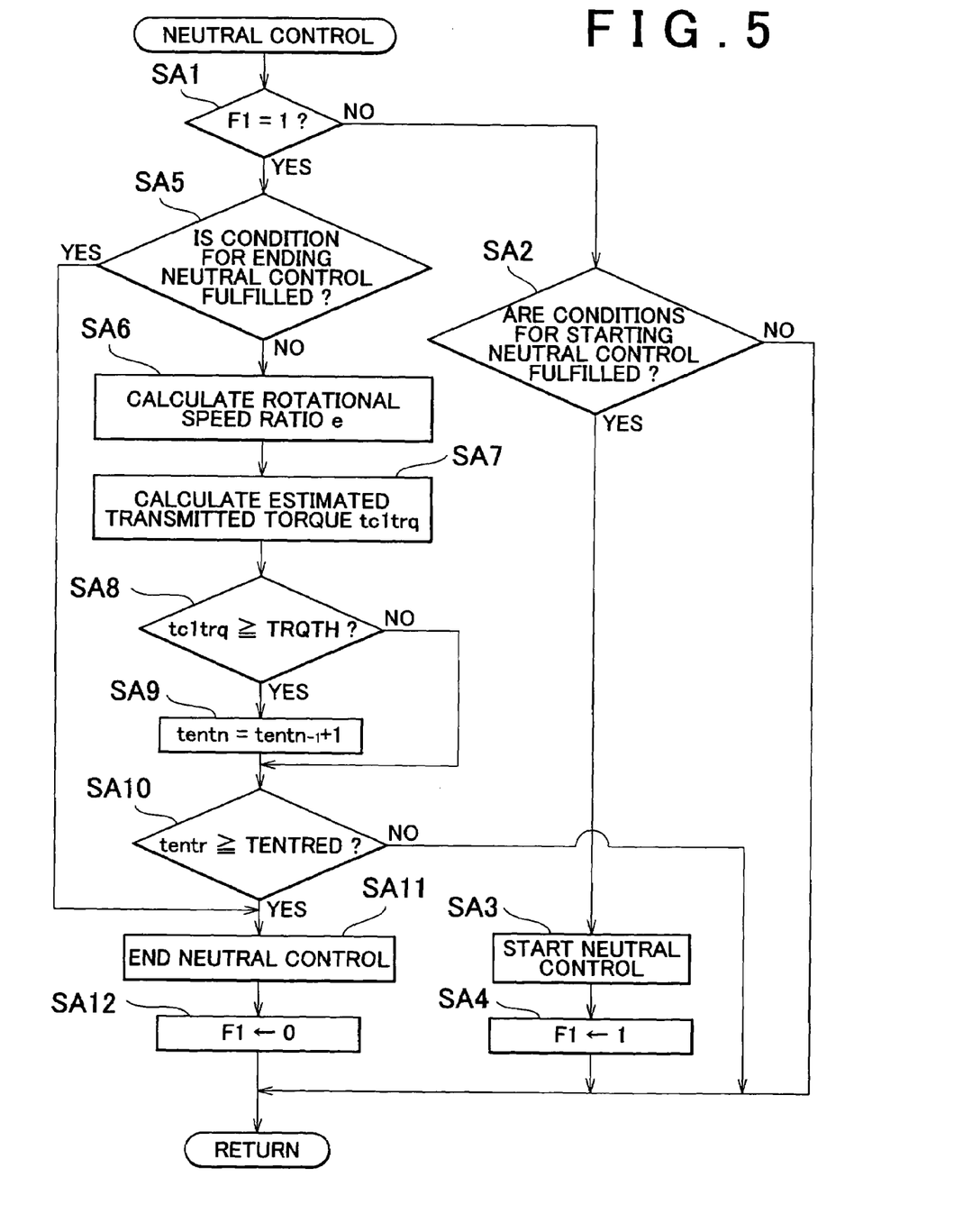
FIG. 5 is a flowchart illustrating a major part of a neutral control operation to be executed by the electronic control unit shown in FIG. 4 while the vehicle is stopped.

FIG. 5 is a flowchart illustrating a major part of a neutral control operation to be executed by the ECU 80 while the vehicle is stopped. The routine in this flowchart is repeatedly executed with a short cycle time on the order of several milliseconds to several tens of milliseconds.

First in step SA1, it is determined whether a flag F1 is "1", i.e., whether a flag F1 is on.

If the determination in step SA1 is yes, then it is determined in step SA5 whether a predetermined condition to end neutral control has been fulfilled. This predetermined condition to end neutral control is determined to have been fulfilled when an operation, such as depression of the accelerator pedal 42, has been performed.

If the determination in step SA1 is no, then it is determined in step SA2 whether predetermined conditions to start the neutral control have been fulfilled. These predetermined conditions to start the neutral control are 1) that the vehicle is stopped and the shift lever is in the "D" position, 2) the accelerator pedal 42 is not being depressed, and 3) the foot brake, not shown, is on.

If the determination in step SA2 is no, the routine ends.

If the determination is yes, however, the neutral control for placing the automatic transmission 16 in the neutral state by controlling the first clutch C1 is started in step SA3. Then in step SA4, the flag F1 is set to "1" and the routine ends.

If the determination in step SA5 is yes, i.e., if the condition for ending the neutral control is fulfilled (e.g., if the accelerator pedal 42 is depressed), the neutral control is ended in step SA11. Then in step SA12 the flag F1 is set to "0" and the routine ends.

If the determination in step SA5 is no, i.e., if the predetermined condition for ending the neutral control is not fulfilled, then the input/output rotational speed ratio e of the torque converter 14 is calculated from the engine speed $N_E$ and the turbine rotational speed $N_T$ in step SA6. Step SA6 corresponds to the rotational speed ratio calculating portion 90.

After step SA6, the estimated transmitted torque tc1trq of the first clutch C1 is calculated based on the engine torque engtrq and the torque ratio τ in step SA7. Here, the engine torque engtrq is calculated from a predetermined relationship between the accelerator opening amount $A_{CC}$ and the engine speed $N_E$. The torque ratio τ is calculated from a predetermined relationship based on the rotational speed ratio e of the torque converter 14 that was calculated in step SA6. Step SA7 corresponds to the transmitted torque estimating portion 92.

After step SA7, it is determined in step SA8 whether the estimated transmitted torque tc1trq of the first clutch C1 that was calculated in step SA7 is equal to, or greater than, the predetermined value TRQTH. Step SA8 corresponds to the transmitted torque determining portion 98.

If the determination in step SA8 is no, then it is determined in step SA10 whether the cumulative time tentr is equal to, or greater than, the predetermined time TENTRED.

If the determination in step SA8 is yes, then in step SA9 one count "1" is added to the cumulative time tentr for which the estimated transmitted torque tc1trq of the first clutch C1 has continually been equal to, or greater than, the predetermined value TRQTH. Step SA9 corresponds to the cumulative time calculating portion 100.

After step SA9, it is determined in step SA10 whether the cumulative time tentr is equal to, or greater than, the predetermined time TENTRED.

If the determination in step SA10 is no, the routine ends.

If the determination is yes, however, the neutral control is ended in step SA11. Then in step SA12 the flag F1 is set to "0" and the routine ends.

In the control described above, steps SA3 and SA11 correspond to the control portion 96.

Figure 6:
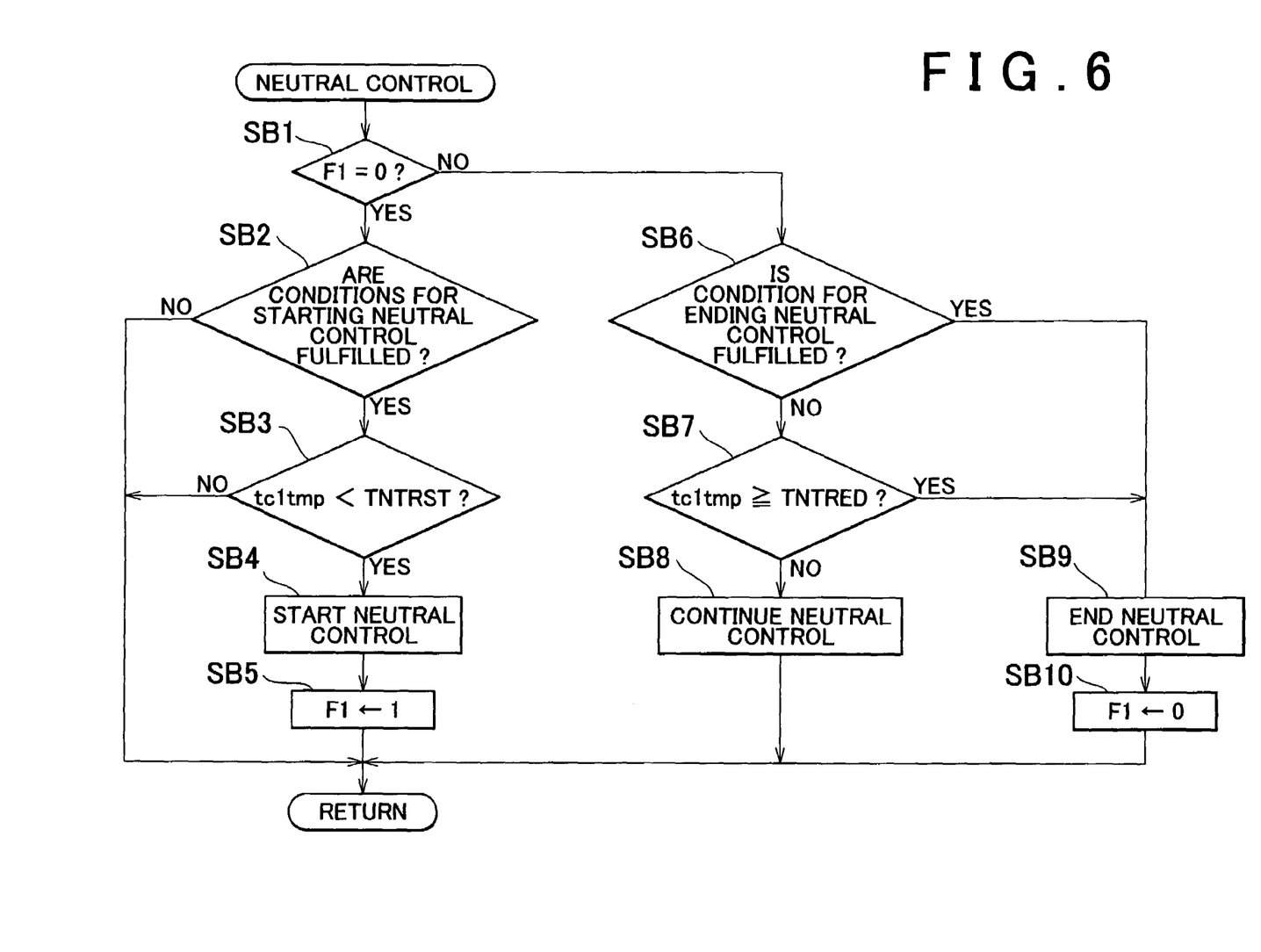
FIG. 6 is a flowchart illustrating another example of a major part of the neutral control operation to be executed by the electronic control unit shown in FIG. 4 while the vehicle is stopped.

FIG. 6 is a flowchart illustrating another example of a major part of the neutral control operation to be executed by the ECU 80 while the vehicle is stopped. The routine in this flowchart is repeatedly executed with a short cycle time on the order of several milliseconds to several tens of milliseconds.

First in step SB1, it is determined whether the flag F1 is "0", i.e., whether the flag F1 is off. If the determination in step SB1 is no, then it is determined in step SB6 whether a predetermined condition to end neutral control has been fulfilled. This predetermined condition to end neutral control is determined to have been fulfilled when an operation, such as depression of the accelerator pedal 42, has been performed.

If the determination in step SB1 is no, then it is determined in step SB2 whether predetermined conditions to start the neutral control have been fulfilled. These predetermined conditions to start the neutral control are 1) that the vehicle is stopped and the shift lever is in the "D" position, 2) the accelerator pedal 42 is not being depressed, and 3) the foot brake, not shown, is on.

If the determination in step SB2 is no, the routine ends. If the determination is yes, however, it is then determined in step SB3 whether the estimated temperature tc1tmp of the first clutch C1 is less than the predetermined value TNTRST. The estimated temperature tc1tmp of the first clutch C1 is obtained as is shown in the flowchart in FIG. 7, which will be described later.

If the determination in step SB3 is no, the routine ends.

If the determination is yes, however, the neutral control for placing the automatic transmission 16 in the neutral state by controlling the first clutch C1 is started in step SB4. Then in step SB5, the flag F1 is set to "1" and the routine ends.

If the determination in step SB6 is yes, i.e., if the condition for ending the neutral control is fulfilled (e.g., if the accelerator pedal 42 is depressed), the neutral control is ended in step SB9. Then in step SB10, the flag F1 is set to "0" and the routine ends.

If the determination in step SB6 is no, i.e., if the condition for ending the neutral control is not fulfilled, then it is determined in step SB7 whether the estimated temperature tc1tmp of the first clutch C1 is equal to, or greater than, the predetermined value TNTRED.

If the determination in step SB7 is no, the neutral control is continued and the routine ends.

If the determination is yes, however, then the neutral control is ended in step SB9. After step SB9, the flag F1 is set to "0" in step SB10 and the routine ends.

In the control described above, steps SB4, SB8, and SB9 correspond to the control portion 96.

Figure 7:
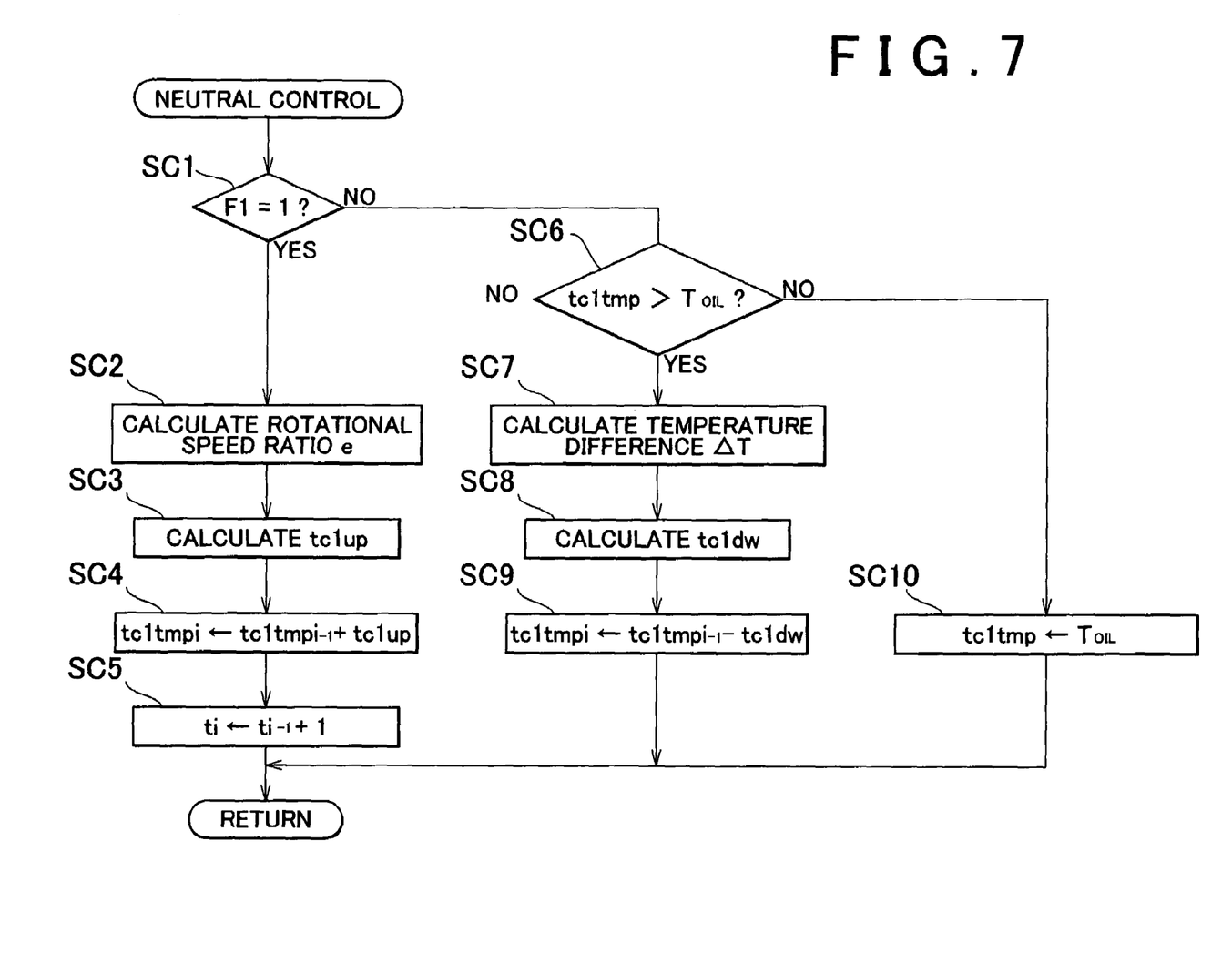
FIG. 7 is a flowchart illustrating a major part of a temperature estimation operation for a first clutch to be executed by the electronic control unit shown in FIG. 4.

FIG. 7 is a flowchart illustrating a major part of a temperature estimation operation for the first clutch C1 to be executed by the ECU 80. The routine in this flowchart is repeatedly executed with a short cycle time on the order of several milliseconds to several tens of milliseconds.

First in step SC1, it is determined whether the flag F1 is "1", i.e., whether the flag F1 is on.

If the determination in step SC1 is no, i.e., if the neutral control is not being executed, then it is determined in step SC6 whether the estimated temperature tc1tmp of the first clutch C1 is higher than the automatic transmission fluid temperature $T_{OIL}$.

If the determination in step SC1 is yes, i.e., if the neutral control is being executed, the input/output rotational speed ratio e of the torque converter 14 is calculated from the engine speed $N_E$ and the turbine rotational speed $N_T$ in step SC2, which corresponds to the rotational speed ratio calculating portion 90.

In step SC3 an estimated temperature rise tc1up of the first clutch C1 is calculated based on the rotational speed ratio e and the continuation time t of the neutral control or the like. Here, the rotational speed ratio e is calculated in step SC2 and the continuation time t of the neutral control is calculated in step SC5, which will be described later.

Then in step SC4, the estimated temperature tc1tmp of the first clutch C1 is calculated based on the estimated temperature rise tc1up that was calculated in step SC3.

In step SC5, one count "1" is added to the continuation time t of the neutral control, after which the routine ends.

If the determination in step SC6 is yes, i.e., if the estimated temperature tc1tmp of the first clutch C1 is higher than the automatic transmission fluid temperature $T_{OIL}$, the temperature difference $\Delta T$ between the estimated temperature tc1tmp and the automatic transmission fluid temperature $T_{OIL}$ is calculated in step SC7.

Then in step SC8, an estimated temperature drop tc1dw of the first clutch C1 is calculated based on the temperature difference $\Delta T$ that was calculated in step SC7.

Then in step SC9, the estimated temperature tc1tmp of the first clutch C1 is calculated based on the estimated temperature drop tc1dw that was calculated in step SC8, after which the routine ends.

If the determination in step SC6 is no, i.e., if the estimated temperature tc1tmp of the first clutch C1 is equal to, or less than, the automatic transmission fluid temperature $T_{OIL}$, the estimated temperature tc1tmp of the first clutch C1 is set to the automatic transmission fluid temperature $T_{OIL}$ of the first clutch C1 in step SC10, and the routine ends.

In the control described above, steps SC3, SC4, SC8, SC9, and SC10 correspond to the temperature estimating portion 94.

Thus, according to the exemplary embodiment, the control portion 96 (i.e., steps SA3 and SA11) end the neutral control when the estimated transmitted torque tc1trq of the first clutch C1, which is the frictional apply device that functions as the input clutch, continues to be equal to, or greater than, the predetermined value TRQTH for the predetermined time TENTRED. Accordingly, by considering the torque transmitted to the frictional apply device in addition to the continuation time of the neutral control, it is possible to more precisely grasp the state of the frictional apply device. In other words, it is possible to provide a control apparatus for a vehicular automatic transmission, which is able to execute, as quickly as possible, neutral control for an extended period of time while ensuring durability.

Further, the control apparatus includes the transmitted torque estimating portion 92 (i.e., step SA7) which calculates the estimated transmitted torque tc1trq of the first clutch C1 based on the predetermined relationship between the rotational speed of the source of driving force, i.e., the engine speed $N_E$, and the input rotational speed of the torque converter 14, i.e., the turbine rotational speed $N_T$. Accordingly, there is the benefit of being able to estimate the torque transmitted to the first clutch C1 in a practical way.

The control apparatus also includes the temperature estimating portion 94 (i.e., steps SC3, SC4, SC8, SC9, and SC10) for calculating the estimated temperature tc1tmp of the first clutch C1. The control portion 96 starts the neutral control when the estimated temperature tc1tmp of the first clutch C1 calculated by the temperature estimating portion 94 is less than the predetermined value TNTRST. Accordingly, by considering the temperature of the frictional apply device, it is possible to more precisely grasp the state of the frictional apply device. In other words, it is possible to provide a control apparatus for a vehicular automatic transmission, which is able to execute, as quickly as possible, neutral control for an extended period of time while ensuring durability.

Further, the control portion 96 ends the neutral control when the estimated temperature tc1tmp of the first clutch C1 calculated by the temperature estimating portion 94 becomes equal to, or greater than, the predetermined value TNTRED. Accordingly, it is possible to ensure the intervals of the neutral control based on the estimated temperature tc1tmp. Thus, there is the benefit of being able to even more reliably execute a neutral control for as long as possible while ensuring durability.

Further, the temperature estimating portion 94 calculates the estimated temperature tc1tmp of the first clutch C1 from the predetermined relationship between the rotational speed of the source of driving force, i.e., the engine speed $N_E$, the input rotational speed of the torque converter 14, i.e., the turbine rotational speed $N_T$, and the automatic transmission fluid temperature $T_{OIL}$. Accordingly, there is the benefit of being able to estimate the torque transmitted to the first clutch C1 in a practical way.

While the invention has been described with reference to preferred embodiments thereof, it is to be understood that the invention is not limited to the preferred embodiments or constructions. To the contrary, the invention is intended to cover various modifications and equivalent arrangements.

For example, in the foregoing exemplary embodiment, the control portion 96 ends the neutral control when the torque transmitted to the first clutch C1 estimated by the transmitted torque estimating portion 92 continues to be equal to, or greater than, a predetermined value for a consecutive predetermined period of time. However, the torque transmitted to the frictional apply device does not necessarily have to be specifically estimated. That is, when the engine 12 is idling, the torque input and transmitted to the first clutch C1 is primarily determined by the input/output rotational speed ratio e of the torque converter 14 calculated by the rotational speed ratio calculating portion 90. Accordingly, the neutral control may also be ended when that rotational speed ratio e remains equal to, or greater than, a predetermined value for a consecutive predetermined period of time.

Also, in the foregoing exemplary embodiment, the invention is applied to a vehicle having a stepped automatic transmission that includes a plurality of planetary gear sets. However, the invention may also be applied to a vehicle having a belt type or toroidal-type continuously variable transmission in which the gear ratio can be changed steplessly.

Further, the foregoing exemplary embodiment describes a control apparatus for a vehicular automatic transmission that controls the first clutch C1 as the frictional apply device (input clutch) that is applied, so as to transmit driving force, when the vehicle is moving forward. The frictional apply device to be controlled, however, is not limited to a hydraulic clutch apparatus. The invention may of course also be applied to a hydraulic brake, an electromagnetic frictional apply device, a magnetic-particle type frictional apply device, or the like.

Also, although not specifically mentioned in the exemplary embodiment, neutral control in which control based on the estimated transmitted torque shown in the flowchart in FIG. 5 is combined with the control based on the estimated temperature shown in the flowchart in FIG. 6 may of course also be executed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for an automatic transmission for a vehicle having a driver controlled element whose actuation indicates an intention of the driver to accelerate the vehicle, comprising:
   a control portion which executes a neutral control in which the control portion places the automatic transmission in a neutral state by reducing an application load on a frictional apply device inside the automatic transmission when the vehicle is substantially stopped and the driver controlled element is not actuated, and which ends the neutral control when the driver controlled element is actuated,
   wherein the control portion ends the neutral control when the driver controlled element is not actuated, when a torque transmitted to the frictional apply device has been continually equal to, or greater than, a predetermined value for a consecutive predetermined period of time.

2. The control apparatus according to claim 1, further comprising:
   a transmitted torque estimating portion that estimates the torque transmitted to the frictional apply device based on a rotational speed of a source of driving force and an input rotational speed of the automatic transmission.

3. The control apparatus according to claim 2, further comprising:
   a transmitted torque determining portion that determines whether the torque transmitted to the frictional apply device that was estimated by the transmitted torque estimating portion is equal to, or greater than, a predetermined value.

4. The control apparatus according to claim 3, further comprising:
a cumulative time calculating portion that calculates a cumulative time for which the torque transmitted to the frictional apply device was equal to, or greater than, the predetermined value.

5. The control apparatus according to claim 1, further comprising:
a temperature estimating portion that estimates a temperature of the frictional apply device,
wherein the control portion starts the neutral control when the temperature of the frictional apply device estimated by the temperature estimating portion is less than a predetermined value.

6. The control apparatus according to claim 5, wherein the control portion ends the neutral control when the temperature of the frictional apply device estimated by the temperature estimating portion becomes equal to, or greater than, the predetermined value.

7. The control apparatus according to claim 5, wherein the temperature estimating portion estimates the temperature of the frictional apply device from a predetermined relationship between the rotational speed of the source of driving force, the input rotational speed of the automatic transmission, and a temperature of hydraulic fluid supplied to the automatic transmission.

8. A control method for an automatic transmission for a vehicle having a driver controlled element whose actuation indicates an intention of the driver to accelerate the vehicle, in a state where the vehicle is substantially stopped, comprising the steps of:
executing a neutral control which includes placing the automatic transmission in a neutral state by reducing an application load on a frictional apply device inside the automatic transmission when the vehicle is substantially stopped and the driver controlled element is not actuated;
ending the neutral control when the driver controlled element is actuated; and
ending the neutral control when the driver controlled element is not actuated, when a torque transmitted to the frictional apply device has been continually equal to, or greater than, a predetermined value for a consecutive predetermined period of time.

9. The control method according to claim 8, further comprising the step of:
estimating the torque transmitted to the frictional apply device based on a rotational speed of a source of driving force and an input rotational speed of the automatic transmission.

10. A control method according to claim 9, further comprising the step of:
determining whether the estimated torque transmitted to the frictional apply device is equal to, or greater than, a predetermined value.

11. A control method according to claim 10, further comprising the step of:
calculating a cumulative time for which the torque transmitted to the frictional apply device was equal to, or greater than, the predetermined value.

12. A control method according to claim 8, further comprising the steps of:
estimating a temperature of the frictional apply device; and
starting the neutral control when the estimated temperature of the frictional apply device is less than a predetermined value.

13. A control method according to claim 12, further comprising the step of:
ending the neutral control when the estimated temperature of the frictional apply device becomes equal to, or greater than, the predetermined value.

14. A control method according to claim 12, further comprising the step of:
estimating the temperature of the frictional apply device from a predetermined relationship between the rotational speed of the source of driving force, the input rotational speed of the automatic transmission, and a temperature of hydraulic fluid supplied to the automatic transmission.

15. A control apparatus for an automatic transmission for a vehicle having a driver controlled means for indicating an intention of the driver to accelerate the vehicle, comprising:
a control means for executing a neutral control in which the control portion places the automatic transmission in a neutral state by reducing an application load on a frictional apply device inside the automatic transmission when the vehicle is substantially stopped and the driver controlled means is not actuated, and which ends the neutral control when the driver controlled means is actuated,
wherein the control means ends the neutral control when the driver controlled means is not actuated, when a torque transmitted to the frictional apply device has been continually equal to, or greater than, a predetermined value for a consecutive predetermined period of time.

* * * * *